United States Patent
Melzer et al.

(10) Patent No.: US 9,628,163 B2
(45) Date of Patent: Apr. 18, 2017

(54) LOW-COMPLEXITY COMMUNICATION TERMINAL WITH ENHANCED RECEIVE DIVERSITY

(71) Applicant: Marvell World Trade Ltd., St. Michael (BB)

(72) Inventors: Ezer Melzer, Tel Aviv (IL); Daniel Yellin, Ra'anana (IL)

(73) Assignee: MARVELL INTERNATIONAL LTD., Hamilton (BM)

(*) Notice: Subject to any disclaimer, the term of this patent is extended or adjusted under 35 U.S.C. 154(b) by 0 days.

(21) Appl. No.: 14/639,140

(22) Filed: Mar. 5, 2015

(65) Prior Publication Data

US 2015/0280804 A1 Oct. 1, 2015

Related U.S. Application Data

(60) Provisional application No. 61/969,948, filed on Mar. 25, 2014.

(51) Int. Cl.
*H03D 3/22* (2006.01)
*H04J 3/04* (2006.01)
*H04B 7/06* (2006.01)
*H04L 9/06* (2006.01)
*H04B 7/08* (2006.01)

(52) U.S. Cl.
CPC ......... *H04B 7/0626* (2013.01); *H04B 7/0854* (2013.01); *H04L 9/06* (2013.01); *H04B 7/063* (2013.01)

(58) Field of Classification Search
USPC .......................................... 375/331; 370/535
See application file for complete search history.

(56) References Cited

U.S. PATENT DOCUMENTS

| | | | | |
|---|---|---|---|---|
| 5,841,816 A | * | 11/1998 | Dent | H04B 7/0857 375/331 |
| 6,292,788 B1 | * | 9/2001 | Roberts | G06Q 30/04 705/35 |
| 6,601,213 B1 | * | 7/2003 | Uchiki | H04L 1/0041 375/340 |
| 7,693,544 B2 | | 4/2010 | Segev | |
| 7,720,168 B2 | * | 5/2010 | Su | H04B 7/0667 375/267 |
| 8,483,641 B1 | | 7/2013 | Mayrench et al. | |
| 8,843,123 B1 | | 9/2014 | Perets et al. | |

(Continued)

OTHER PUBLICATIONS

International Application # PCT/IB2015/051881 Search Report dated Aug. 25, 2015.

(Continued)

*Primary Examiner* — Daniel Washburn
*Assistant Examiner* — Sarah Hassan

(57) ABSTRACT

A method includes, in a receiver, receiving a signal carrying data using multiple antennas, so as to produce multiple respective input signals. The input signals are divided into two or more subsets. The input signals within each of the subsets are combined in a first diversity-combining stage, to produce respective intermediate signals. In a second diversity-combining stage, the intermediate signals are combined to produce an output signal. The output signal is decoded so as to reconstruct the data carried by the received signal.

11 Claims, 2 Drawing Sheets

(56) References Cited

U.S. PATENT DOCUMENTS

| | | | |
|---|---|---|---|
| 2001/0006535 A1* | 7/2001 | Csomo | H04B 7/04 375/240.27 |
| 2002/0024975 A1* | 2/2002 | Hendler | H04B 1/0003 370/535 |
| 2002/0191700 A1* | 12/2002 | Varshney | H04N 19/63 375/240.19 |
| 2003/0167314 A1* | 9/2003 | Gilbert | H04L 29/06 709/217 |
| 2003/0236081 A1 | 12/2003 | Braun | |
| 2004/0114674 A1* | 6/2004 | Lotter | H04B 1/71075 375/148 |
| 2004/0116078 A1* | 6/2004 | Rooyen | H04B 1/7107 455/101 |
| 2004/0196780 A1* | 10/2004 | Chin | H04B 7/2628 370/208 |
| 2005/0128362 A1* | 6/2005 | Teichner | H04N 5/44 348/725 |
| 2007/0071150 A1 | 3/2007 | Yang et al. | |
| 2007/0099578 A1* | 5/2007 | Adeney | H04B 7/0408 455/69 |
| 2007/0268876 A1 | 11/2007 | Yellin et al. | |
| 2008/0003969 A1 | 1/2008 | Segev et al. | |
| 2011/0142108 A1* | 6/2011 | Agee | H04B 7/0413 375/219 |

OTHER PUBLICATIONS

3GPP TS 36.306, "3rd Generation Partnership Project;Technical Specification Group Radio Access Network;Evolved Universal Terrestrial Radio Access (E-UTRA);User Equipment (UE) radio access capabilities", Release 10, version 10.11.0, 25 pages, Dec. 2013.

Woodbury matrix identity, 5 pages, Mar. 1, 2013 (http://en.wikipedia.org/wiki/Woodbury_matrix_identity ).

* cited by examiner

1

LOW-COMPLEXITY COMMUNICATION TERMINAL WITH ENHANCED RECEIVE DIVERSITY

CROSS-REFERENCE TO RELATED APPLICATIONS

This application claims the benefit of U.S. Provisional Patent Application 61/969,948, filed Mar. 25, 2014, whose disclosure is incorporated herein by reference.

FIELD OF THE DISCLOSURE

The present disclosure relates generally to wireless communication, and particularly to methods and systems for diversity reception.

BACKGROUND

Modern wireless communication terminals are often equipped with multiple antennas and multiple reception chains, e.g., for supporting carrier aggregation, receive antenna diversity, receive beamforming and/or spatial multiplexing. For example, $3^{rd}$ Generation Partnership Project (3GPP) specification TS 36.306, "Technical Specification Group Radio Access Network; Evolved Universal Terrestrial Radio Access (E-UTRA); User Equipment (UE) radio access capabilities (Release 10)," version 10.11.0, December, 2013, which is incorporated herein by reference, specifies categories and capabilities of Long-Term Evolution (LTE) User Equipment (UE), including UEs equipped with multiple antennas.

The description above is presented as a general overview of related art in this field and should not be construed as an admission that any of the information it contains constitutes prior art against the present patent application.

SUMMARY

An embodiment that is described herein provides a method including, in a receiver, receiving a signal carrying data using multiple antennas, so as to produce multiple respective input signals. The input signals are divided into two or more subsets. The input signals within each of the subsets are combined in a first diversity-combining stage, to produce respective intermediate signals. In a second diversity-combining stage, the intermediate signals are combined to produce an output signal. The output signal is decoded so as to reconstruct the data carried by the received signal.

In some embodiments, dividing the input signals includes assessing a characteristic of a communication channel over which the signal is received, and assigning the input signals to the subsets based on the characteristic. In an embodiment, combining the input signals includes evaluating a respective error measure for one or more of the input signals, and selecting an input signal having a lowest error measure. In another embodiment, combining the intermediate signals includes evaluating a respective error measure for one or more of the intermediate signals, and selecting an intermediate signal having a lowest error measure.

In yet another embodiment, combining the input signals includes generating a respective sequence of soft bits for each subset, and combining the intermediate signals includes combining the sequences of the soft bits. In still another embodiment, combining the input signals includes generating a respective sequence of soft symbols for each subset, and combining the intermediate signals includes combining the sequences of the soft symbols. In an example embodiment, generating the soft symbols includes estimating respective Signal-to-Noise Ratios (SNRs) for the soft symbols, and combining the sequences includes combining the soft symbols in accordance with the SNRs.

In a disclosed embodiment, receiving the signal includes estimating a noise covariance matrix for the multiple input signals, and dividing the input signals into the subsets includes nulling off-diagonal elements of the noise covariance matrix that are associated with pairs of the input signals that belong to different subsets. In an embodiment, the method further includes computing and transmitting from the receiver Channel State Information (CSI) feedback that reflects performance of the first and second diversity-combining stages.

There is additionally provided, in accordance with an embodiment that is described herein, an apparatus including reception circuitry and baseband processing circuitry. The reception circuitry is configured to receive a signal carrying data using multiple antennas, so as to produce multiple respective input signals. The baseband processing circuitry is configured to divide the input signals into two or more subsets, to combine the input signals within each of the subsets in a first diversity-combining stage so as to produce respective intermediate signals, to combine the intermediate signals in a second diversity-combining stage so as to produce an output signal, and to decode the output signal so as to reconstruct the data carried by the received signal.

In some embodiments, a mobile communication terminal includes the disclosed apparatus. In some embodiments, a chipset for processing signals in a mobile communication terminal includes the disclosed apparatus.

There is also provided, in accordance with an embodiment that is described herein, a method including, in a receiver that includes multiple antennas and multiple receiver chains, evaluating a criterion and, based on the criterion, selecting a mode from: a first mode, in which one or more of the antennas are disconnected, and at least one of the remaining antennas is connected to more than one of the receiver chains; and a second mode, in which each of the antennas is connected to a respective receiver chain. A signal is received using the multiple receiver chains in accordance with the selected mode.

In an embodiment, evaluating the criterion includes selecting the first mode when the signal includes a Carrier Aggregation (CA) signal, and selecting the second mode when the signal includes a non-CA signal. In an embodiment, receiving the signal includes, when the selected mode includes the second mode, diversity-combining the signal received via two or more of the receiver chains.

There is additionally provided, in accordance with an embodiment that is described herein, an apparatus including reception circuitry and baseband processing circuitry. The reception circuitry includes multiple receiver chains coupled to multiple antennas. The baseband processing circuitry is configured to evaluate a criterion, to select based on the criterion a mode from among a first mode, in which one or more of the antennas are disconnected and at least one of the remaining antennas is connected to more than one of the receiver chains, and a second mode in which each of the antennas is connected to a respective receiver chain, and to receive a signal using the multiple receiver chains in accordance with the selected mode.

The present disclosure will be more fully understood from the following detailed description of the embodiments thereof, taken together with the drawings in which:

DETAILED DESCRIPTION OF EMBODIMENTS

Figure 1A:
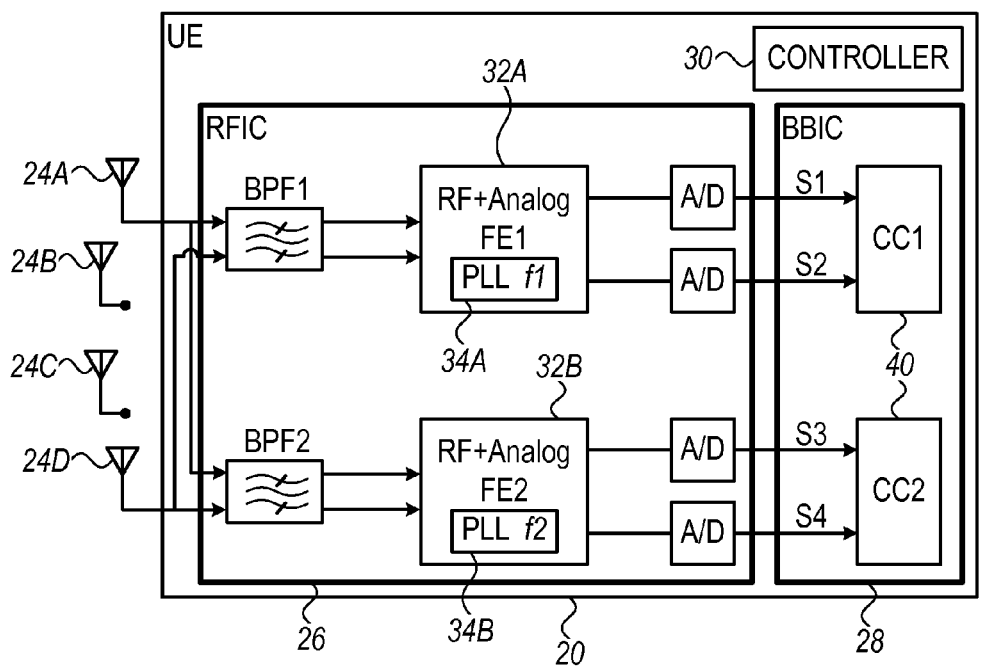
FIGS. 1A and 1B are block diagrams that schematically illustrate a wireless communication terminal, in accordance with an embodiment that is described herein.

Embodiments that are described herein provide improved methods and systems for diversity reception in wireless communication receivers. In some embodiments, a receiver comprises multiple receive antennas and multiple receive processing chains, for example in order to receive multiple Component Carriers (CC) of a Carrier Aggregation (CA) signal, or to receive multiple data streams of a spatially-multiplexed signal.

In some scenarios, the number of receive chains is larger than the minimal number required for decoding the received signal. This scenario occurs, for example, when a receiver designed for carrier-aggregation reception is requested to receive only a single carrier. In some disclosed embodiments, the receiver exploits such situations for performing a high-performance multi-stage diversity-combining scheme.

In some embodiments, the receiver divides the input signals produced by the multiple antennas into two or more subsets, either in a fixed partitioning or in an adaptive partitioning based on current channel conditions. In a first diversity-combining stage, baseband circuitry in the receiver combines the input signals within each of the subsets, so as to produce respective intermediate signals. In a second diversity-combining stage, the baseband circuitry combines the intermediate signals to produce an output signal. The baseband circuitry then decodes the output signal and reconstructs the data carried by the received signal.

Several examples of multi-stage diversity-combining processes are described herein. The overall multi-stage process typically comprises tasks such as pre-equalization, noise and channel-response estimation, equalization and channel decoding. The disclosed embodiments differ from one another, for example, in the partitioning into tasks that are performed on the signals within each subset, and tasks that are performed jointly after combining the signals.

By dividing the overall diversity-combining process into stages, each stage involves computations whose dimensionality is lower than the number of receive antennas. As such, the processes described herein require far less computational complexity than comparable single-stage diversity combining. Nevertheless, the disclosed processes achieve comparable performance to that of joint diversity-combining over the entire set of signals.

In some embodiments, the receiver supports two modes of operation. In one mode, e.g., a mode used for single-carrier reception, each of the antennas is connected to a single respective receiver chain. Operation in this mode may comprise the above-described diversity-combining schemes. In another mode, one or more of the antennas are disconnected, and at least one of the remaining antennas is connected to more than one of the receiver chains. This mode may be used, for example, for receiving multiple component carriers concurrently. In some embodiments, the computations in either mode are performed with a dimensionality that is lower than the number of receive antennas.

Figure 1B:
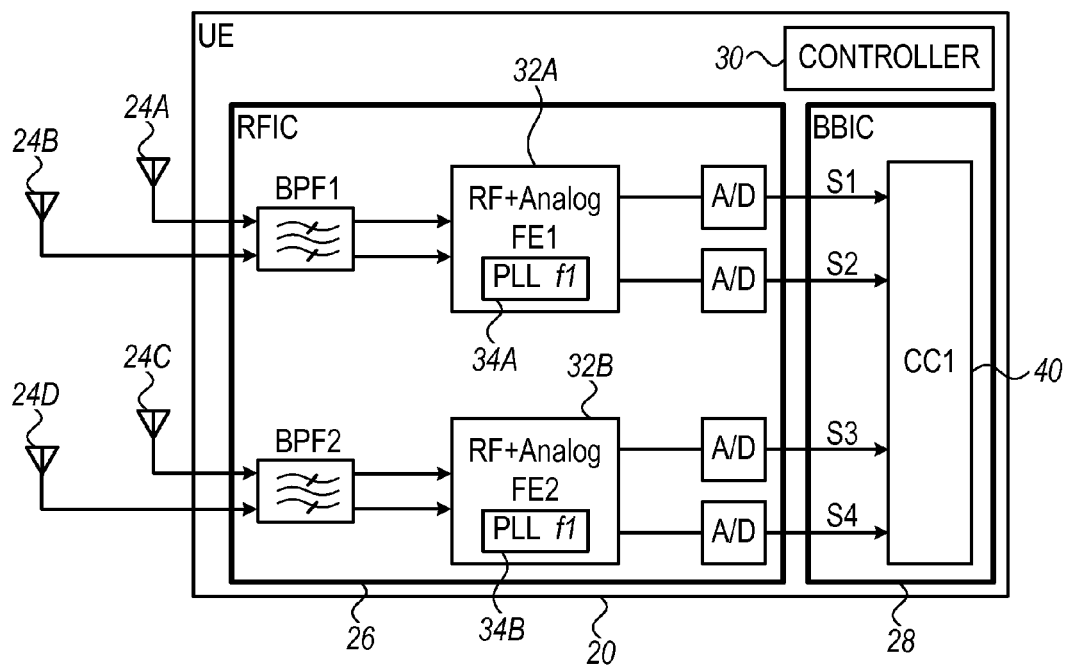

FIGS. 1A and 1B are block diagrams that schematically illustrate a wireless communication terminal (also referred to as UE) 20 operating in two respective operational modes, in accordance with an embodiment that is described herein. The present example refers to a Release-10, category-6 LTE UE, in accordance with the TS 36.306 specification cited above. In alternative embodiments, however, UE 20 comprises any other suitable wireless terminal operating in accordance with any other suitable communication standard or protocol.

In this embodiment, UE 20 comprises four receive antennas 24A . . . 24D, a Radio-Frequency Integrated Circuit (RFIC) 26 that carries out RF and analog reception functions of the UE, a Baseband IC (BBIC) 28 that carries out baseband processing functions of the UE, and a controller 30 that controls and manages the UE. RFIC 26 is also referred to herein as reception circuitry, and BBIC 28 is also referred to as baseband processing circuitry.

In the present example, RFIC 26 comprises four receiver chains arranged in two pairs. The first pair of receiver chains comprises a Band-Pass Filter (BPF) denoted BPF1, an RF & analog Front End (FE) 32A that comprises a Phase-Locked Loop (PLL) 34A, and a pair of Analog/Digital (A/D) converters. The sampled digital outputs of the two receiver chains, denoted S1 and S2, are provided to BBIC 28.

The second pair of receiver chains comprises a BPF denoted BPF2, an RF & analog FE 32B that comprises a Phase-Locked Loop (PLL) 34B, and another pair of Analog/Digital (A/D) converters. The sampled digital outputs of the two receiver chains in the second pair, denoted S3 and S4, are also provided to BBIC 28.

PLLs 34A and 34B are configured independently by controller 30, either to the same frequency or to different frequencies. RFIC 26 further comprises suitable RF switching circuitry (not shown explicitly in the figures), controlled by controller 30, for switching the appropriate antennas to the appropriate receiver chain.

In some embodiments, UE 20 is configurable to operate in at least two operational modes. In the first mode, seen in FIG. 1A, UE 20 is configured to receive a Carrier Aggregation (CA) signal that comprises two Component Carriers CC1 and CC2, on two respective frequencies f1 and f2. In an embodiment, frequency f1 is different from frequency f2. In the second mode, seen in FIG. 1B, UE 20 is configured to receive a single component carrier (CC), denoted CC1, on frequency f1.

In the first mode, controller 30 configures PLLs 34A and 34B to different frequencies, so that the first pair of receiver chains receives CC1 on frequency f1, and the second pair of receiver chains receives CC2 on frequency f2. Controller 30 further configures the switching circuitry to connect antenna 24A to the first and third receiver chains, to connect antenna 24B to the second and fourth receiver chains, and to disconnect antennas 24B and 24C. Each CC is thus received using two receiver chains via two respective antennas. This configuration enables BBIC 28 to perform spatial-multiplexing reception of up to two spatial streams ("layers") on each CC, using the multiple different communication channels between the base-station antennas and antennas 24A and 24B.

In the second mode, seen in FIG. 1B, controller 30 configures PLLs 34A and 34B to the same frequency, so that all four receiver chains receive CC1 on frequency f1. Controller 30 further configures the switching circuitry to connect antennas 24A . . . 24D to the first, second, third and fourth receiver chains, respectively. CC1 is thus received using four different receiver chains via four respective antennas. This configuration supports spatial-multiplexing reception of up to four spatial streams on the single CC, as well as various diversity reception schemes, in an embodiment.

In BBIC 28, baseband circuitry demodulates the four baseband signals S1 ... S4. In the first mode (FIG. 1A), a first carrier processing unit 40 demodulates CC1 from signals S1 and S2, and a second carrier processing unit 40 demodulates CC2 from signals S3 and S4. In the second mode (FIG. 1B), a single carrier processing unit 40 demodulates CC1 based on signals S1 ... S4. Note that the two units 40 in FIG. 1A need not necessarily comprise separate hardware units, but may alternatively be implemented by operating a single hardware unit in time alternation, e.g., once on each CC.

In various embodiments, controller 30 switches between the first and second modes in accordance with various suitable criteria. In one embodiment, controller 30 switches to the first mode (FIG. 1A) when UE 20 is to receive a Carrier Aggregation (CA) signal, and switches to the second mode (FIG. 1B) when UE 20 is to receive a non-CA single-carrier signal. Alternatively, controller 30 may use any other suitable criterion for deciding when to switch between the two modes.

The UE, RFIC and BBIC configurations shown in FIGS. 1A and 1B are simplified example configurations, which are depicted solely for the sake of clarity. In alternative embodiments, any other suitable configurations can be used. For example, UE 20 may comprise any other suitable number of receive antennas, any other suitable number of receiver chains, and/or any other suitable antenna switching scheme or mode definition. Additionally or alternatively, the receiver chains may be grouped in any other suitable manner, in pairs or otherwise, for supporting reception of any other suitable number of component carriers, either in contiguous of non-contiguous frequency channels.

Some UE, RFIC and BBIC elements that are not mandatory for understanding of the disclosed techniques have been omitted from the figure for the sake of clarity. For example, since the disclosed techniques focus mainly on signal reception, signal transmission elements of the UE have been omitted for clarity.

The different elements of UE 20 may be implemented using dedicated hardware, such as using one or more Application-Specific Integrated Circuits (ASICs) and/or Field-Programmable Gate Arrays (FPGAs). Alternatively, some elements may be implemented using software executing on programmable hardware, or using a combination of hardware and software elements. In some embodiments, some or all of the elements of UE 20 are fabricated in a signal-processing chip-set.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2A:
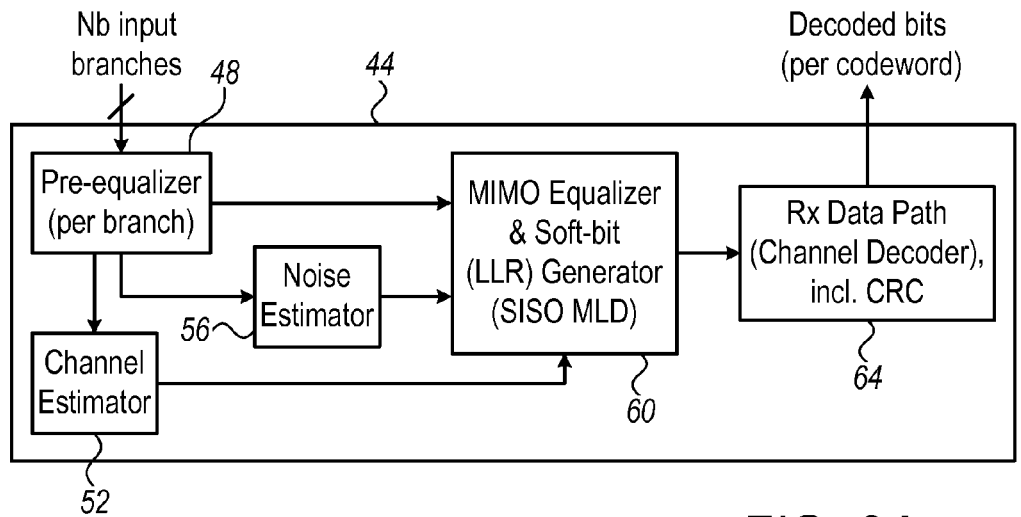
FIGS. 2A and 2B are block diagrams that schematically illustrate carrier processing units in a wireless communication terminal, in accordance with embodiments that are described herein.

FIG. 2A is a block diagram that schematically illustrates a carrier processing unit 44, in accordance with an embodiment that is described herein. In an embodiment, the configuration shown in FIG. 2A is used for implementing component carrier processing units 40 in BBIC 28 of FIGS. 1A and 1B above.

In an embodiment, carrier processing unit 44 accepts multiple baseband signals derived from a given carrier. The number of baseband signals is denoted Nb. The description that follows refers, by way of example, to the configuration of FIG. 1B in which Nb=4 and the input signals are signals S1 ... S4 derived from component carrier CC1. Carrier processing unit 44 in this example decodes up to two spatially-multiplexed data streams, each typically comprising bits of one or more code words, from the four input signals. As noted above, in alternative embodiments other suitable numbers of signals and data streams are also feasible.

In this embodiment, a pre-equalizer module 48 pre-equalizes each input signal. A channel estimation module 52 estimates the channel response for each input signal. A noise estimation module 56 estimates the noise covariance for each pair of input signals (and thus between each pair of receive antennas). An equalizer & soft-bit generation module 60 equalizes the input signals based on the channel responses (output of module 52) and noise covariance estimates (output of module 56). Module 60 generates soft-bits (e.g., Log-Likelihood Ratios—LLRs) for the bits of the data streams. A receive data-path module 64 decodes the code words using the soft-bits, and performs Cyclic Redundancy Check (CRC) verification on the decoded bits. The decoded bits are provided as output.

In the example of FIG. 2A, module 60 performs Multiple-Input Multiple-Output (MIMO) equalization (typically linear) followed by Single-Input Single-Output Maximum Likelihood Detection (SISO MLD) soft-bit generation. This solution, however, is given by way of example. An alternative solution is shown in FIG. 2B below.

Figure 2B:
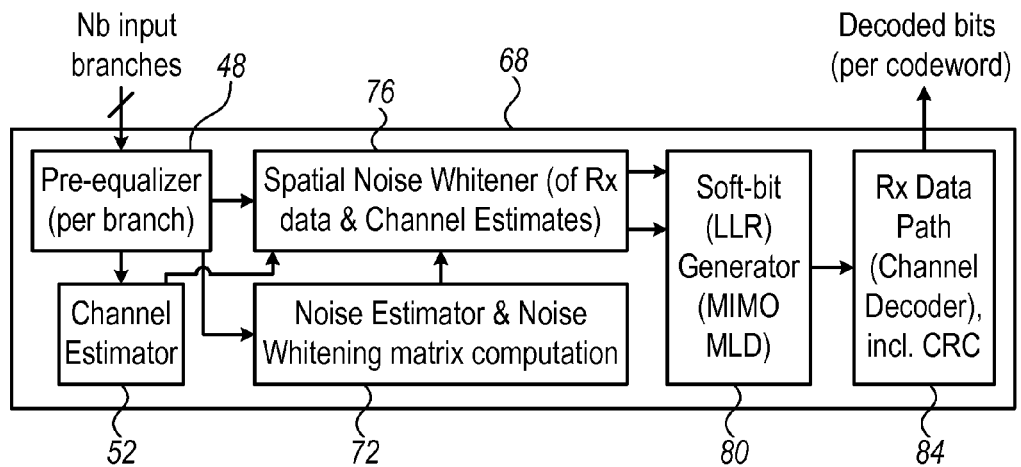

FIG. 2B is a block diagram that schematically illustrates a carrier processing unit 68, in accordance with an embodiment that is described herein. This scheme, too, is applicable for implementing carrier processing units 40 in BBIC 28 of FIGS. 1A and 1B above. In unit 68 the soft-bits are generated using multi-dimensional MIMO MLD, as opposed to the linear equalization and SISO MLD solution of FIG. 2A.

In the present example, unit 68 comprises a noise estimation and whitening module 72, which estimates the noise covariance values (similarly to module 56 of FIG. 2A), and also computes a whitening transformation (e.g., a whitening matrix). The whitening matrix, also referred to as a spatial noise de-correlation matrix, typically comprises an inverse square root of the noise covariance matrix. A noise whitener module 76 whitens both the input signals and the channel response estimates using the whitening matrix, so as to essentially de-correlate the noise in the Nb baseband input signals entering unit 68.

A soft-bit generation module 80 generates soft-bits (e.g., LLRs) based on the whitened signals and channel estimates. In this embodiment, module 80 is free to assume that the four signals have uncorrelated and normalized noise components. A receive data-path module 84 decodes the code words using the soft-bits generated by module 80, and performs CRC verification on the decoded bits. The decoded bits are provided as output.

The decoding schemes of FIGS. 2A and 2B above are example schemes that are depicted solely for the sake of conceptual clarity. In alternative embodiments, any other suitable decoding scheme can be used.

In various embodiments, modules 60, 64, 80 and 84 in units 44 and 68 of FIGS. 2A and 2B apply their designated functions either to individual signals, or to combinations of signals, as part of multi-stage diversity-combining processes that are described in detail below. Applying a certain module to different signals can be implemented either using multiple hardware replicas of that module, or by operating the same module multiple times.

Consider, for example, the configuration of FIG. 1B above. In this configuration BBIC 28 is provided with four baseband signals S1 . . . S4 that all pertain to the same carrier (CC1). Each of the four signals is received by a different antenna and receiver chain. Nevertheless, the maximal number of data streams in carrier CC1 is two. This over-dimensioning in the number of signals enables BBIC 28 to apply various diversity-combining schemes, thereby improving the performance of decoding the data streams.

The embodiments described below provide several example diversity-combining schemes, which exploit the fact that the number of available received signals is larger than the number of spatial streams. The schemes described below enable different trade-offs between performance gain and complexity.

In some embodiments, BBIC 28 divides the input signals S1 . . . S4 into subsets, and carries out a multi-stage diversity-combining process. In a first diversity-combining stage, the BBIC performs diversity-combining among the signals within each subset, to produce intermediate signals. In a second diversity-combining stage, the BBIC performs diversity-combining among the intermediate signals to produce a combined signal. Examples of two-stage combining processes can be seen in FIGS. 3 and 4 below. The decoded data bits of the combined signal are provided as output.

The two-stage diversity-combining process described herein is applicable to the example configuration of four input signals that are divided into two subsets. In other configurations, any other suitable number of input signals, subsets and diversity-combining stages can be used. The multi-stage diversity-combining processes described herein can be implemented using the scheme of FIG. 2A, using the scheme of FIG. 2B, or using any other suitable decoding scheme.

For four input signals, it is possible to define three divisions into two-signal subsets: [{S1,S2} {S3,S4}],[{S1, S3} {S2,S4}] and [{S1,S4} {S2,S3}]. In one embodiment, the division of the input signals into the subsets is fixed. In other embodiments, BBIC 28 changes the assignment of input signals to subsets adaptively, e.g., depending on the current channel characteristics.

In an embodiment, the assignment of input signals to subsets aims to reduce the correlation between the signals within each subset, and/or to balance the reception quality among the subsets. Generally, however, any other suitable assignment criterion can be used. In order to simplify the explanation, the description that follows refers, without loss of generality, to pairing of [{S1,S2} {S3,S4}].

In one embodiment, BBIC 28 applies the entire carrier processing chain of FIG. 2A or 2B, from pre-equalization through decoding and including CRC verification, to each of the subsets (signal-pairs) separately. In this embodiment, module 64 or 84 produces one CRC result for the code word decoded from signal pair {S1,S2}, and another CRC result for the code word decoded from signal pair {S3,S4}. A code word whose decoded bits yield a valid CRC is used as output. In another embodiment, the BBIC applies the entire carrier processing chain to each of the four input signals separately, including CRC verification. The BBIC outputs a code word for which the CRC is valid.

Since the channel and noise characteristics are statistical, the probability that all CRCs will fail simultaneously is low, and therefore the above schemes have considerable diversity gain. More generally, the BBIC may evaluate any other suitable error measure, not necessarily a CRC, and choose the decoded bits for which the error measure is the lowest.

Figure 3:
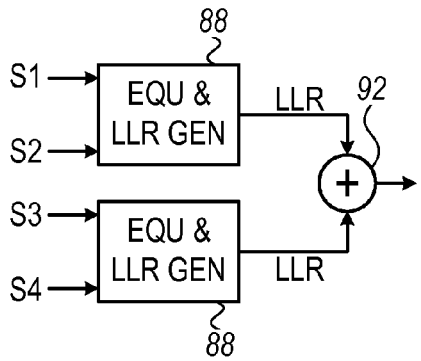
FIGS. 3 and 4 are block diagrams that schematically illustrate two-stage diversity-combining schemes, in accordance with embodiments that are described herein.

FIG. 3 is a block diagram that schematically illustrates a two-stage diversity-combining scheme, in accordance with another embodiment that is described herein. In the present example, equalization & LLR generation modules 88 perform equalization and LLR generation on the signals of each subset. A combiner 92 then combines the LLRs originating from the two subsets, e.g., by summing the LLRs with or without weighting.

In an embodiment, the scheme of FIG. 3 is implemented by invoking module 60 of FIG. 2A twice (once on S1 and S2, and once on S3 and S4), and combining the invocation results. The LLRs at the output of combiner 92 are then provided to data-path module 64.

Figure 4:
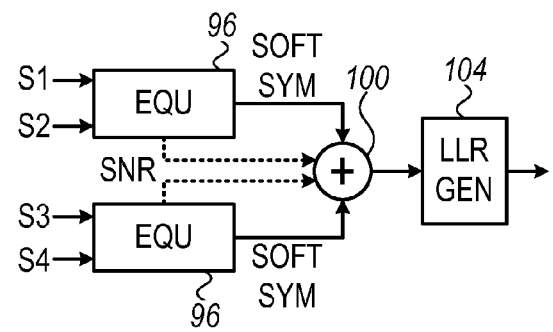

FIG. 4 is a block diagram that schematically illustrates a two-stage diversity-combining scheme, in accordance with yet another embodiment that is described herein. In this embodiment, equalization modules 96 perform equalization on the signals of each subset, so as to produce respective soft symbols. In addition, each equalization module 96 estimates the respective Signal to Noise Ratios (SNRs) of the soft symbols it produces.

In this embodiment, a combiner 100 combines corresponding equalized soft symbols from the two subsets, in accordance with the SNRs. Typically, soft symbols having higher SNR are given higher weight in the combination, and vice versa. In an embodiment, combiner 100 performs SNR-weighted averaging of the soft symbols accompanied by summation of the respective SNRs. An LLR generation module 104 generates LLRs based on the combined soft symbols produced by combiner 100.

In various embodiments, combiner 100 and LLR generation module 104 may generate the LLRs (or other soft bits) in various ways, e.g., using Maximum Ratio Combining (MRC), Interference Rejection Combining (IRC), Linear Minimum Mean Square Error (LMMSE), LMMSE-IRC, or any other suitable soft-bit generation scheme.

In an embodiment, the scheme of FIG. 4 is implemented by splitting the functionality of module 60 of FIG. 2A into separate equalization (module 96) and LLR generation (module 104) functionalities, and invoking the equalization module twice (once on S1 and S2, and once on S3 and S4). The LLRs at the output of module 104 are then provided to data-path module 64.

In an alternative embodiment, component carrier processing unit 40 in BBIC 28 equalizes all four signals S1 . . . S4 together, but imposes certain restrictions on the estimated noise covariance matrix $R_{nn}$ used by the equalization algorithm. In the present example $R_{nn}$ is a 4-by-4 matrix whose elements comprise the noise cross-correlations between pairs of the input signals S1 . . . S4. In this embodiment, unit 40 nulls the off-diagonal elements of $R_{nn}$ that correspond to pairs of input signals that belong to different subsets. Aspects of such restrictions are addressed, for example, in U.S. Pat. No. 8,483,641, whose disclosure is incorporated herein by reference.

In other words, unit 40 constrains $R_{nn}$ to be block-diagonal, by assuming that (at least) the off-diagonal elements representing cross-correlations between the noise in receiver chains that belong to different subsets are zero.

The above constraint simplifies the BBIC process considerably. For example, the noise estimation module (module 56 of FIG. 2A or module 72 of FIG. 2B) can be implemented by two invocations of a 2-by-2 noise covariance estimator (once on S1 and S2, and once on S3 and S4), instead of performing full-fledged 4-by-4 noise covariance estimation.

Moreover, some equalization schemes, for example LMMSE with MRC or IRC, involve matrix manipulations whose complexity increase with the dimensionality of the relevant matrices, e.g., the channel matrix H (whose dimensionality is $N_{RX}$-by-$N_{TX}$, wherein $N_{RX}$ denotes the number of receive antennas 24 and $N_{TX}$ denotes the number of base station transmit antennas), and the noise covariance matrix $R_{nn}$ (whose dimensionality is $N_{RX}$-by-$N_{RX}$). In the present example, $N_{RX}=4$ and $N_{TX}=2$. As such, some of the computations of dimension 4-by-4 can be converted into simpler 2-by-2 computations, at the expense of computing the inverse of the 4-by-4 $R_{nn}$ matrix. This 4-by-4 matrix inversion, which is rather complex in general, is significantly simpler under the constraint of a block-diagonal $R_{nn}$ matrix, since it then reduces to two inversions of 2-by-2 matrices (the two non-zero blocks of the original $R_{nn}$ matrix).

In some embodiments, UE 20 calculates and transmits Channel State Information (CSI) feedback to the base station. The CSI feedback assists the base station in configuring the parameters of subsequent downlink transmissions. In some embodiments, the UE is expected to feed-back the optimal values of certain parameters specifying the transmission scheme, such as rank, precoding scheme or Modulation and Coding Scheme (MCS), within an agreed-upon range. This sort of feedback is referred to as implicit feedback, since it implicitly characterizes the current conditions of the channel and noise.

Implicit CSI feedback, however, should also reflect the characteristics of the receiver implementation, in order not to mislead the base station. Thus, in some embodiments, any of the above-described diversity-combining schemes is complemented by a CSI feedback calculation that reflects the diversity-combining performance. The feedback scheme indicates to the base station that UE 20 is able to receive higher throughput (facilitated by the improved diversity-combining) under given channel conditions. In a typical embodiment, BBIC 28 or controller 30 computes post-processing SNR measures that take into account the actual diversity-combining scheme being used, and uses these SNR measures for calculating the CSI feedback parameters (e.g., rank, precoding scheme and/or MCS).

Although the embodiments described herein mainly address the LTE-Advanced communication standard (3GPP EUTRA, Release 10 and beyond), the methods and systems described herein can also be used in other applications, such as in multi-carrier WCDMA (3GPP UTRA, Release 8 and beyond).

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a receiver, receiving a signal carrying data using multiple antennas, so as to produce multiple respective input signals;
   assessing a characteristic of a communication channel over which the signal is received, and dividing the input signals adaptively, based on the assessed characteristic of the communication channel, into two or more subsets for separate diversity combining;
   in a first diversity-combining stage, applying a first diversity-combining process to the input signals within each of the subsets, by evaluating a respective error measure for one or more of the input signals and selecting an input signal having a lowest error measure, so as to produce respective intermediate signals;
   in a second diversity-combining stage, applying a second diversity-combining process to the intermediate signals to produce an output signal; and
   decoding the output signal so as to reconstruct the data carried by the received signal.

2. A method, comprising:
   in a receiver, receiving a signal carrying data using multiple antennas, so as to produce multiple respective input signals;
   assessing a characteristic of a communication channel over which the signal is received, and dividing the input signals adaptively, based on the assessed characteristic of the communication channel, into two or more subsets for separate diversity combining;
   in a first diversity-combining stage, applying a first diversity-combining process to the input signals within each of the subsets, to produce respective intermediate signals;
   in a second diversity-combining stage, applying a second diversity-combining process to the intermediate signals, by evaluating a respective error measure for one or more of the intermediate signals and selecting an intermediate signal having a lowest error measure, so as to produce an output signal; and
   decoding the output signal so as to reconstruct the data carried by the received signal.

3. The method according to claim 1, wherein applying the first diversity-combining process to the input signals comprises generating a respective sequence of soft bits for each subset, and wherein applying the second diversity-combining process to the intermediate signals comprises combining the sequences of the soft bits.

4. The method according to claim 1, wherein applying the first diversity-combining process to the input signals comprises generating a respective sequence of soft symbols for each subset, and wherein applying the second diversity-combining process to the intermediate signals comprises combining the sequences of the soft symbols.

5. The method according to claim 4, wherein generating the soft symbols comprises estimating respective Signal-to-Noise Ratios (SNRs) for the soft symbols, and wherein combining the sequences comprises combining the soft symbols in accordance with the SNRs.

6. The method according to claim 1, wherein receiving the signal comprises estimating a noise covariance matrix for the multiple input signals, and wherein dividing the input signals into the subsets comprises nulling off-diagonal elements of the noise covariance matrix that are associated with pairs of the input signals that belong to different subsets.

7. The method according to claim 1, comprising computing and transmitting from the receiver Channel State Information (CSI) feedback that reflects performance of the first and second diversity-combining stages.

8. Apparatus, comprising:
reception circuitry, which is configured to receive a signal carrying data using multiple antennas, so as to produce multiple respective input signals; and
baseband processing circuitry, which is configured to estimate a noise covariance matrix for the multiple input signals, to assess a characteristic of a communication channel over which the signal is received, to divide the input signals adaptively, based on the assessed characteristic of the communication channel, into two or more subsets for separate diversity combining, by nulling off-diagonal elements of the noise covariance matrix that are associated with pairs of the input signals that belong to different subsets, to apply a first diversity-combining process to the input signals within each of the subsets in a first diversity-combining stage so as to produce respective intermediate signals, to apply a second diversity-combining process to the intermediate signals in a second diversity-combining stage so as to produce an output signal, and to decode the output signal so as to reconstruct the data carried by the received signal.

9. The apparatus according to claim 8, wherein the baseband processing circuitry is configured to generate a respective sequence of soft bits or soft symbols for each subset, and to combine the sequences of the soft bits or soft symbols.

10. A mobile communication terminal comprising the apparatus of claim 8.

11. A chipset for processing signals in a mobile communication terminal, comprising the apparatus of claim 8.

* * * * *